March 14, 1933.  F. L. KALLAM  1,901,032
FLUID FLOW CONTROL DEVICE
Filed Aug. 10, 1929
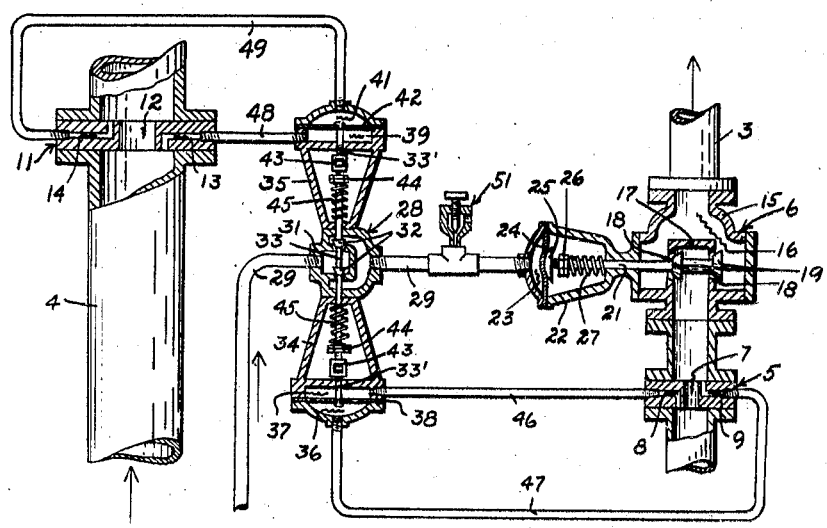
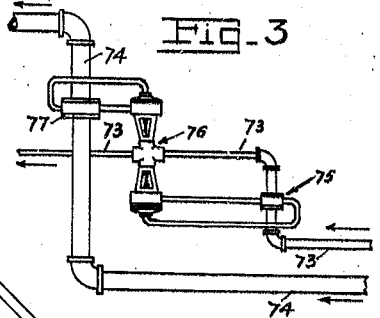
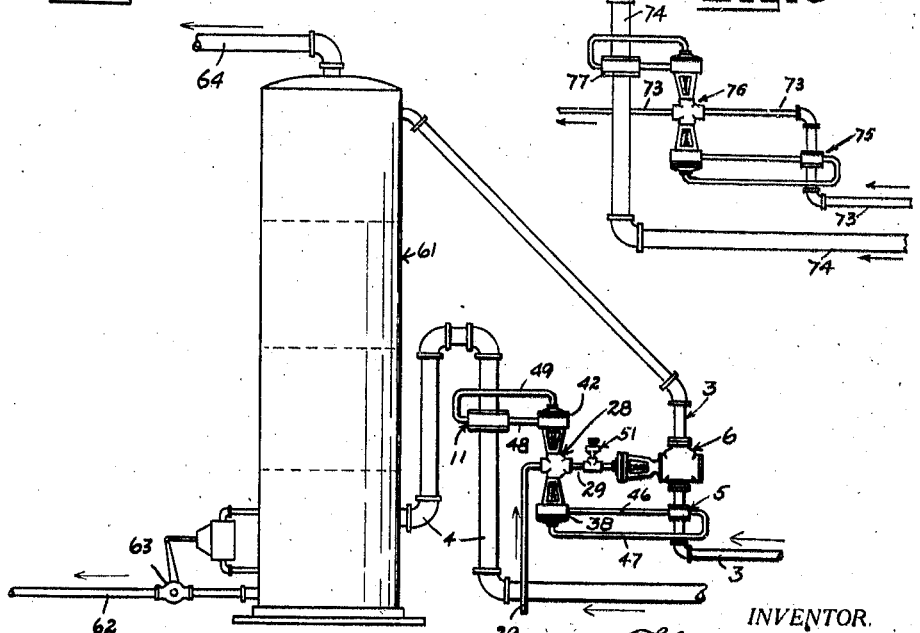
INVENTOR.
BY Floyd L. Kallam
M. C. Frank
ATTORNEY.

Patented Mar. 14, 1933

1,901,032

UNITED STATES PATENT OFFICE

FLOYD L. KALLAM, OF SOUTH GATE, CALIFORNIA

FLUID FLOW CONTROL DEVICE

Application filed August 10, 1929. Serial No. 384,980.

The invention relates to a device for maintaining the quantity flow rate of a fluid in one pipe in fixed ratio to the flow rate of a second fluid in another pipe.

An object of the invention is to provide an improved and entirely automatic method for effecting the aforesaid control.

Another object of the invention is to provide an apparatus for carrying out the method which operates in a particularly positive and dependable manner.

A further object of the invention is to bring about a new combination and correlation of parts in a device of the class described whereby elements of standard structure may be utilized and the efficiency of the device will be enhanced.

The invention possesses other objects and features of advantage, some of which, with the foregoing, will be set forth or be apparent in the following description of a typical embodiment of the invention which is illustrated in the accompanying drawing, in which:

Figure 1 discloses a generally diagrammatic arrangement of an apparatus for carrying out the invention, the operative elements thereof being shown in section.

Figure 2 is a minified view of the apparatus in operative association with an absorber used in the production of hydro-carbon fuels.

Figure 3 shows a modified arrangement of the control apparatus.

As particularly illustrated, apparatus is provided for maintaining a flow of fluid through a pipe 3 at a rate which bears a fixed ratio to the possibly variable flow of fluid through a second pipe 4, said fluids being either liquid or gaseous. An orifice plate 5 and throttle valve 6 are interposed in the pipe 3, the valve being particularly shown as installed at the discharge, or rear, side of the orifice plate. The orifice plate 5 is of a type commonly used in metering fluids, and besides a central orifice 7 is provided with a pair of radial passages 8 and 9 extending respectively from the forward and rear faces of the plate at points in the pipe passage. An orifice plate 11 is interposed in the pipe 4, said latter plate being similar to the plate 5 and providing an orifice 12 and radial passages 13 and 14 from the forward and rear faces thereof, respectively.

The valve 6 is arranged for a motor operation thereof and in the present instance is of the diaphragm operated reciprocable disc type. For insuring close regulation, the valve 6 is preferably also of the balanced disc type wherein the pressure of the controlled fluid is eliminated as a factor in the control of the valve, the specific structure shown therefor being intended as typical of the many different balanced diaphragm-motor valves on the market. In the present instance, the valve 6 is seen to comprise a body 15 providing a fluid passage 16 therethrough having a partition 17 disposed thereacross, said partition being provided with a pair of ports 18. Valve discs 19 are provided for cooperatively controlling the fluid flow through the ports 18, said discs being fixed on a common stem 21 and being so related to the different ports 18 that the fluid pressure in the passage at the intake ends of the ports tends to unseat one valve and seat the other with like degrees of force; in this manner, the control of the valve is independent of the pressure in the controlled fluid.

A radial extension 22 of the valve body 15 provides a pressure chamber 23 having a flexible and circular diaphragm 24 comprising one wall thereof and the valve stem 21 is directed axially toward said diaphragm. A head 25 is provided at the free end of the stem 21 for engagement with the diaphragm 24, and a collar 26 is adjustably mounted on the stem 21 adjacent the head 25; as shown, the collar 26 is seen to comprise a pair of nuts threadedly engaging the stem and arranged to be locked together in predetermined position on the stem. An helical compression spring 27 encircles the stem and is operative between the collar 26 and valve body 15 to urge the stem to dispose the valve discs 19 in fully seated position, the valve 6 being thus normally closed. When a positive fluid pressure obtains in the chamber 23, the diaphragm 24 is distended outwardly against the head 25 of the valve rod and so is arranged to effect an opening movement of the valve discs 19 against the resistance of the spring 27 and to a degree which varies directly with the pressure in the chamber 23, whereby said pressure governs the valve setting. The adjustable disposal of the collar 26 on the stem is, of course, understood to provide for the adjustment of the resistance offered by the spring 27.

It will now be noted that the supply of actuating fluid to the valve chamber 23 is arranged to be effected through the delivery thereto of fluid under pressure from a pilot valve 28, and that the latter is in turn jointly controlled by the pressure conditions at the orifice plates 5 and 11 in the respective pipes 3 and 4. In the present instance, the control fluid used is compressed air, and the valve 28 is accordingly interposed in a pipe 29 carrying air under pressure to the chamber 23; the primary source of the compressed air is immaterial, and the pipe 29 may be considered the source for present purposes.

The valve 28 is also of the balanced diaphragm motor type, and includes a body 31 similar to the body 15 of the valve 6 and in which are operative a pair of valve discs 32 carried on a stem 33 extending through and oppositely from the valve body. Body extensions 34 and 35 of the valve 28 provide pairs of pressure chambers separated by diaphragm walls; thus, the extension 34 provides chambers 36 and 37 separated by a disc diaphragm 38 and chambers 39 and 41 and a disc diaphragm 42 are provided on the extension 35.

The centers of the diaphragms 38 and 42 are operatively connected to the opposite ends of the valve stem 33. For purposes of adjustment of the effective stem length, stem extensions 33' are secured at their inner ends to the extremities of the valve stem 33 by turnbuckles 43, and the other ends of these extensions are fixed to the diaphragms 38 and 42 centrally thereof. Collars 44 are adjustably mounted on the stem 33 at opposite sides of the valve body 31, and compression springs 45 encircling the stem are engaged between the collars 44 and body 31 whereby to urge the stem to maintain an adjustably centered position thereof to dispose the valve discs 32 in an adjusted and intermediate open position. As shown, the collars 44 comprise pairs of nuts threadedly mounted on the stem and arranged for mutual locking.

It will now be noted that the various pressure chambers of the pilot valve 28 are each connected to different of the discharge passages of the orifice plates 5 and 11 in such manner that the differential pressures created at said plates by reason of the fluid flow through the plate orifices oppose each other in the operation of the valve stem 33 of the pilot valve. As shown, the passages 8 and 9 of the plate 5 are connected respectively to the pilot valve chambers 37 and 36 by means of pipes 46 and 47, and the passages 13 and 14 of the plate 11 are respectively connected to the pilot valve chambers 39 and 41 by means of pipes 48 and 49. In this manner, the pressure differentials of the two orifice plates are arranged to act oppositely through the diaphragms to tense the valve stem 33 in its position.

A relief valve 51 is connected in the portion of the air pipe 29 between the valve 28 and the pressure chamber 23 of the valve 6; as shown, the valve 51 is of the needle type for close regulation. This valve is intended to be always open to a fixed and adjusted degree.

Referring now to Figure 1, it is noted that the various valves 6, 28 and 51 are in the conditions which obtain therefor when the fluid flow rate in the pipe 3 bears the desired ratio to that in the pipe 4. Under these conditions, the orifice plates 5 and 11 have been so chosen that the pressure differentials created at each are equal when the flow ratio is as desired whereby the pilot valve stem 33 remains in the before mentioned spring centered position thereof. Under these conditions, just the right amount of air is allowed to flow from the pilot valve 28 to create such a pressure in the chamber 23 of the control valve 6 as will hold the valve 6 open for maintaining the desired flow in the pipe 3, exact adjustment being effected by regulatably setting the relief needle valve 51.

If now, the flow rate in the pipe 4 should increase, the resulting increase of orifice produced pressure differential between the chambers 39 and 41 of the valve 28 will move the diaphragm 42 to longitudinally dislodge the stem 33 for increasing the air passage through said valve whereby to effect an increased flow of air to the chamber 23 to effect an added degree of opening of the valve 6. But this opening of the valve 6, in permitting an increased flow through the pipe 3, builds up the differential pressure created at the orifice plate 8 and so at the chambers 36 and 37 of the valve 28, whereby the stem 33 is finally drawn back to its spring balanced position at which it stays as long as the higher flow rate obtains in the pipe 4.

If the flow rate in the pipe 4 decreases, a reverse action takes place with respect to the control valve 6 and said valve is allowed to close somewhat until a balance is again reached. It is further noted that if the pressure in the pipe 3 should change for any reason whereby to increase or decrease the flow rate through the orifice plate 5, the device would effect a closing or opening of the valve 6 to respectively decrease or increase the flow in the pipe 3 to maintain the required flow ratio. It will thus be obvious that the device is arranged to automatically maintain a constant and predetermined ratio between the quantity flow rates of fluids in the pipes 3 and 4. One or both of the fluids handled may be either liquid or gas and only the choice of proper orifice plates is required for adapting the device to the control of a specific fluid combination. A further feature of the present set up is the fact that the adjustments provided for permits a certain range of adjusted variation from the fluid flow ratio for which the orifice plates are specifically selected, thus providing for a fine regulation of said ratio.

In the present instance, the control device now described has been specifically arranged for controlling the proportioning of absorption oil and gas flowing to an absorber such as is used in refining natural gasoline.

As particularly disclosed in Figure 2, the device is associated with an absorber 61, with the pipes 3 and 4 respectively conducting the oil and gas thereto. The oil from the absorber is discharged through a pipe 62 having therein a float-controlled valve 63, while the final gas product is discharged from the absorber through a pipe 64. The exact absorber structure is not pertinent to the present invention, however, nor is the use of the disclosed control device limited to absorbers. It is noted that the valve 6 might be included in the steam line of a pump which delivers oil to the absorber rather than in the oil line itself, the orifice plate 5 being retained in the oil line. Furthermore, the device is not limited to use in the oil refining arts but is applicable in many other industries where it is desired to keep constant the ratio of the quantity flow rates of different fluids.

In the installations where the quantity flow rate through one pipe is a very small fraction of that through the other (one to four hundred, for instance), a modification of the hereinbefore described control apparatus may be effected by omitting the valve 6 and connecting the pipe of small flow directly to the motor valve 28 in lieu of the air connection for the latter valve. Such apparatus and connections are shown in Figure 3, wherein the constancy of the ratio of the fluid flows in pipes 73 and 74 is to be effected, the pipe 73 carrying the stream of least quantity flow. An orifice plate 75 and a motor valve 76 are interposed in the pipe 73, while an orifice plate 77 is interposed in the pipe 74. The orifice plates 75 and 77 are of any suitable structure; as shown, they are of the same type as the orifice plates 5 and 11 of the first described embodiment. The motor valve 76 and the diaphragm control means therefor are of the same structures as for the valve 28 previously described, whereby the degree of opening of the passage provided through the valve 76 is arranged to be controlled with respect to an intermediate open position thereof in accordance with the equality, or lack of equality, in the pressure differentials existing in the pressure pipes of the different orifice plates.

Assuming a normal opening provided by and through the motor valve 76, an increase or decrease of fluid flow through the pipe 73, as by an increase or decrease in effective pressure therein, will increase or decrease the pressure differential at the orifice plate 75 for automatically effecting a motor closing or opening of the valve 76 to provide the required regulation. It will thus be clear that the operation of the valve 76 is arranged to effect a similar regulation to that afforded by the first described apparatus. The present apparatus, while providing a very much finer control when a small flow is to be regulated, is not satisfactory under the more usual large flow conditions for which the first described arrangement of apparatus is designed. It is noted that the modification of Figure 3 has been successfully used in adding a modifying liquid to motor gasoline, said modifying liquids being applied to gasoline in a volume ratio of about one to four hundred.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In combination, pipes carrying streams of fluid, a motor valve operative in a said pipe and including a valve stem, spring means coactive with said valve stem to constantly and yieldingly urge a disposal thereof to close the valve, means providing a chamber having a flexible diaphragm wall bearing axially of and against said valve stem, a pipe conveying fluid to said chamber for expanding the chamber against resistance of said spring means, a valve in said last pipe to control the fluid flow therein, means simultaneously operative in accordance with the fluid flow rates in the said first pipes to urge opposite actuations of said control valve, and a constantly open relief valve in said last pipe between said chamber and control valve.

2. In combination, pipes carrying streams of fluid, a motor valve operative in a said pipe and including a valve stem, mechanical means coactive with said valve stem to constantly and yieldingly urge a disposal thereof to close the valve, means providing an expansible chamber having a movable wall bearing axially of and against said valve stem, a pipe conveying fluid to said chamber for expanding said chamber against resistance of said mechanical means, a valve in said last pipe to control the fluid flow therein, and means simultaneously operative in accordance with the fluid flow rates in the said first pipes to urge opposite actuations of said control valve.

3. In combination, pipes carrying streams of fluid, a motor valve operative in a said pipe and including a valve stem, mechanical means coactive with said valve stem to constantly and yieldingly urge a disposal thereof to close the valve, means providing a closed and expansible chamber having a movable wall portion, operative connections between said wall portion and said valve stem whereby an expansion of said chamber is arranged to effect a movement of said stem to open said valve, means supplying fluid to said chamber under pressure and for expanding the chamber to displace said wall for opening the valve against the resistance of said first means, and means automatically controlling the pressure in said chamber, said means operative by and in accordance with the simultaneously existent fluid flow rates in the different said first pipes for tending to produce opposite variations in said pressure.

In testimony whereof, I affix my signature.

FLOYD L. KALLAM.